United States Patent
Matsumoto (10) Patent No.: US 7,373,140 B1
(45) Date of Patent: May 13, 2008

(54) WIRELESS COMMUNICATION SYSTEM AND METHOD OF CHANGING LANGUAGE TO BE DISPLAYED IN WIRELESS CLIENT

(75) Inventor: Hidehiro Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 766 days.

(21) Appl. No.: 09/691,802

(22) Filed: Oct. 19, 2000

(30) Foreign Application Priority Data

Oct. 20, 1999 (JP) .................................. 11-297535

(51) Int. Cl.
*H04L 29/08* (2006.01)
(52) U.S. Cl. .................. 455/414.4; 455/566; 455/557; 455/403; 455/411; 455/414.1; 455/561; 455/419; 379/201.01; 379/88.3; 717/170; 717/171; 715/523; 715/542
(58) Field of Classification Search ................ 455/566, 455/557, 403, 411, 414.1, 414.4, 418, 419, 455/550.1, 561, 560; 379/201.01, 261.04, 379/88.3; 717/170, 171; 715/523, 542
See application file for complete search history.

(56) References Cited

U.S. PATENT DOCUMENTS

| | | | | |
|---|---|---|---|---|
| 5,814,798 | A * | 9/1998 | Zancho | 235/380 |
| 6,065,008 | A * | 5/2000 | Simon et al. | 707/10 |
| 6,313,735 | B1 * | 11/2001 | Higuchi | 340/7.54 |
| 6,401,091 | B1 * | 6/2002 | Butler et al. | 707/10 |
| 6,857,102 | B1 * | 2/2005 | Bickmore et al. | 715/501.1 |
| 2001/0000358 | A1 * | 4/2001 | Isomichi et al. | 713/201 |
| 2001/0003191 | A1 * | 6/2001 | Kovacs et al. | 709/226 |
| 2002/0194261 | A1 * | 12/2002 | Teshima | 709/203 |
| 2003/0078631 | A1 * | 4/2003 | Nelson et al. | 607/30 |
| 2003/0203732 | A1 * | 10/2003 | Eerola | 455/422.1 |

FOREIGN PATENT DOCUMENTS

| | | |
|---|---|---|
| CN | 1133538 A | 10/1996 |
| JP | 08-202655 * | 8/1996 |
| JP | 9-7070 | 1/1997 |
| JP | 11-234436 | 8/1999 |

OTHER PUBLICATIONS

Timothy Bickmore et al "Web Page Filtering and Re-Authoring for Mobile Users" Aug. 18, 1998. Palo Alto Laboratory, CA ☐☐pp. 534-546. The Computer Journal, vol. 42, No. 6.*

* cited by examiner

*Primary Examiner*—Quochien B. Vuong
*Assistant Examiner*—Richard Chan
(74) *Attorney, Agent, or Firm*—Scully, Scott, Murphy & Presser, P.C.

(57) ABSTRACT

A wireless communication system is provided which supplies an only necessary font to a wireless client and avoids incorrect display on the wireless client. A wireless communication gateway server receives language information from the wireless client, and supplies a required font to the wireless client. The font is determined based on the language information by using a user control server including user information database and a font server including a plurality of fonts.

39 Claims, 10 Drawing Sheets

WIRELESS COMMUNICATION SYSTEM AND METHOD OF CHANGING LANGUAGE TO BE DISPLAYED IN WIRELESS CLIENT

BACKGROUND OF THE INVENTION

1. Field of the Invention

The invention relates to a wireless communication system and a method changing a language to be displayed in a wireless client and, in particular, to a method of changing a language to be displayed in a system which uses the Internet from the wireless client.

2. Description of the Related Art

In the prior art, a wireless communication gateway server which resides between an information source server connected to the Internet and a wireless network, at first, temporarily stores data to be sent to a wireless client such as a wireless communication device (terminal). Then, the server sends the data to the wireless client so that a buffer memory of the client does not overflow, by monitoring a state of the buffer memory. This is done so as to avoid instability of communication due to decrease of a bandwidth, a delay, or an interrupted wave of the Internet and the wireless network.

The wireless client sends an identifier ID) used to authenticate a user and attribute information of a client to the wireless communication gateway server, before commencement of an internet connection service.

The attribute information of the client may be CC/PP (Composite Capability/Preference Profiles) optionally prescribed by W3C (World Wide Web Consortium) and UAPROF (User Agent PROFile) optionally prescribed by WAP (Wireless Application Protocol) forum. Therefore, the information may include an area of display part of the client, the number of pixels, a foreground color, an input device, a font, and character codes used to display or input.

The wireless client is required to be light, less electric power consumption, and low price. Therefore, it is desirable to avoid unnecessary electric power consumption and to have a minimum amount of memory and a minimum configuration of display device.

However, nowadays, the client is required to display many languages and input using many languages since an Internet service is used not only in Japan but also in other countries. Also, even a country or a region has many official languages.

Further, some of carriers and providers are characterized in that pictographs or pictograms are provided to users. However, these pictographs or pictograms are different for each carrier (provider) and are not interchangeable.

In the prior wireless communication system, if a font used to display information of the information source server is not coincident with a font stored in a font memory of the Wireless client when information stored in the information source server connected to the Internet is sent to the wireless communication gateway server via the Internet and the information is further sent from the wireless communication gateway server to the wireless client via a wireless network, a problem occurs that correct characters are not displayed and user of the wireless client can not read the characters correctly.

To recognize the characters correctly, it is necessary to identify a language used in the wireless communication gateway server and change the font to a proper font. In this case, the wireless communication gateway server is required to simultaneously perform font changing processes for a plurality of wireless clients, therefore, the load on the gateway server is increased.

On the other hand, if the wireless client stores a plurality of fonts in the font memory, even an unused font may be stored and therefore the font memory can be used efficiently. It is also uneconomical to store a plurality of fonts. Also, the carrier and the provider may provide a special font such as pictograms specific to a user, in this case the wireless client is needed to change a font according to the carrier/provider.

SUMMARY OF THE INVENTION

Therefore, it is an object of the invention to provide a wireless communication system and a method of changing a language to be displayed in a wireless client which can overcome the above problem, store minimum patterns of fonts required for the wireless client, economically use the wireless client, and avoid incorrect display of the font.

According to a first aspect of the invention, there is provided a wireless communication system which supplies information data to a wireless client through a wireless data communication network. The system comprises an information source server which includes the information data and a gateway server which is connected to the information source server via a network and selectively connected to the wireless client via the wireless data communication network. Herein, the gateway server comprises a font storing unit for storing a font which is used in the wireless client to output the information data, a font determining unit for determining a font to be stored in the font storing unit, and a font transferring unit for transferring the determined font to the wireless client. And the gateway server temporarily stores the information data sent from the information source server and sends the information data to the wireless client according to a state for data receiving of the wireless client.

According to a second aspect of the invention, there is provided a method of changing language displayed in a wireless client of a wireless communication system which includes a gateway server connected to the wireless client via a wireless data communication network. The method comprises, at the gateway server, the steps of temporarily storing information data, sending the information data to the wireless client according to a state for data receiving of the wireless client, determining a font used in the wireless client to output the information data, and transferring the determined font to the wireless client.

According to a third aspect of the invention, there is provided a wireless client of a wireless communication system which sends information data from an information source server to the wireless client via a gateway server. The wireless client comprises a language notifying unit which notifies the gateway server of a language, a font storing unit which stores a font which is determined based on the language and sent from the gateway server, and an output unit which outputs the information data from the information source server using the stored font.

According to a fourth aspect of the invention, there is provided a gateway server of a wireless communication system which sends information data from an information source server to a wireless client via the gateway server. The gateway server comprises a font determining unit which determines a font to be used in the wireless client, and a font transferring unit which transfers the determined font to the wireless client.

According to a fifth aspect of the invention, there is provided a user control server of a wireless communication system which sends information data from an information source server to a wireless client via a gateway server including the user control server. The user control server comprises an authenticating unit which performs authentication for connecting the wireless client to the gateway server, a font determining unit which determines a font to be used in the wireless client, and a font transferring unit which transfers the determined font to the wireless client.

According to a sixth aspect of the invention, there is provided a font server of a wireless communication system which sends information data from an information source server to a wireless client via a gateway server to which the font server is connected. The font server comprises a font storing unit which stores a font used to represent the information data in the wireless client, and a font supplying unit which supplies the font in the font storing unit to the gateway server in response to a request from the gateway server.

According to a seventh aspect of the invention, there is provided a recording medium readable by a computer, tangibly embodying a program of instructions executable by the computer to perform a method of changing language displayed in a wireless client of a wireless communication system. The method comprises the steps of, at the gateway server which is connected to the wireless client via the wireless data communication network, temporarily storing information data, sending the information data to the wireless client according to a state for data receiving of the wireless client, determining a font used in the wireless client to output the information data, and transferring the determined font to the wireless client.

That is, according to the method of the invention, a plurality of fonts are not stored in a wireless client and minimum font required by a user is stored, therefore the wireless client which is a small size, light weight, and low electric power consumption can be made.

Specifically, the method of the invention limits fonts to be stored in the wireless client to fonts required for a user of the wireless client.

The required fonts are determined by using information such as an identification code of the wireless client at a authentication process performed in commencing a service to the wireless client.

The determined fonts are transferred to the wireless client from a font server or a font memory in the gateway server.

Also, in determining the fonts, a user control server which cooperates with the gateway server uses a user information database. The database includes information such as authentication of the wireless client or a history of attribute information.

Thereby, the conventional problem can be solved and the wireless client can store only necessary fonts. Therefore, the wireless client can be used economically and can avoid incorrect display of information data from an information server.

Further, since the fonts are determined before the information data from the information server is arrived, for example, information provider can accumulate in a font server fonts required for advertisement.

Still further, when the wireless client moves another area to be required to display another font, the wireless client can advantageously display the required font.

Also, since the user control server can determine a plurality of fonts used in the wireless client using attribute information, the wireless client can adapt for many languages.

DESCRIPTION OF THE PREFERRED EMBODIMENT

Figure 1:
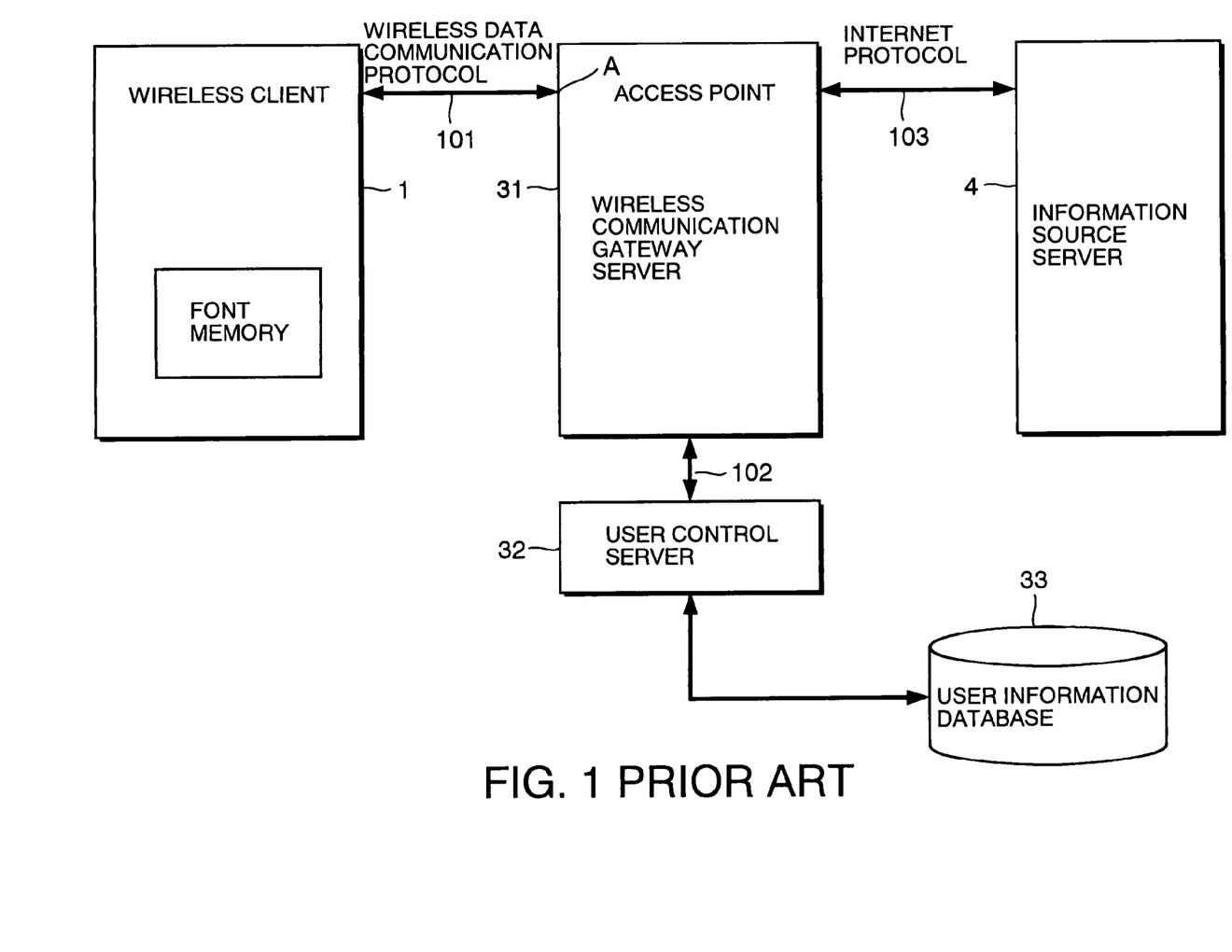
FIG. 1 shows a block diagram representing a conventional wireless communication system.

At first, illustration is made about a conventional wireless communication system with reference to FIG. 1.

In FIG. 1, the conventional wireless communication system includes a wireless client 1 having a font memory 11, a wireless communication gateway server 31, a user control server 32, an information source server 4, and a user information database 33.

Figure 2:
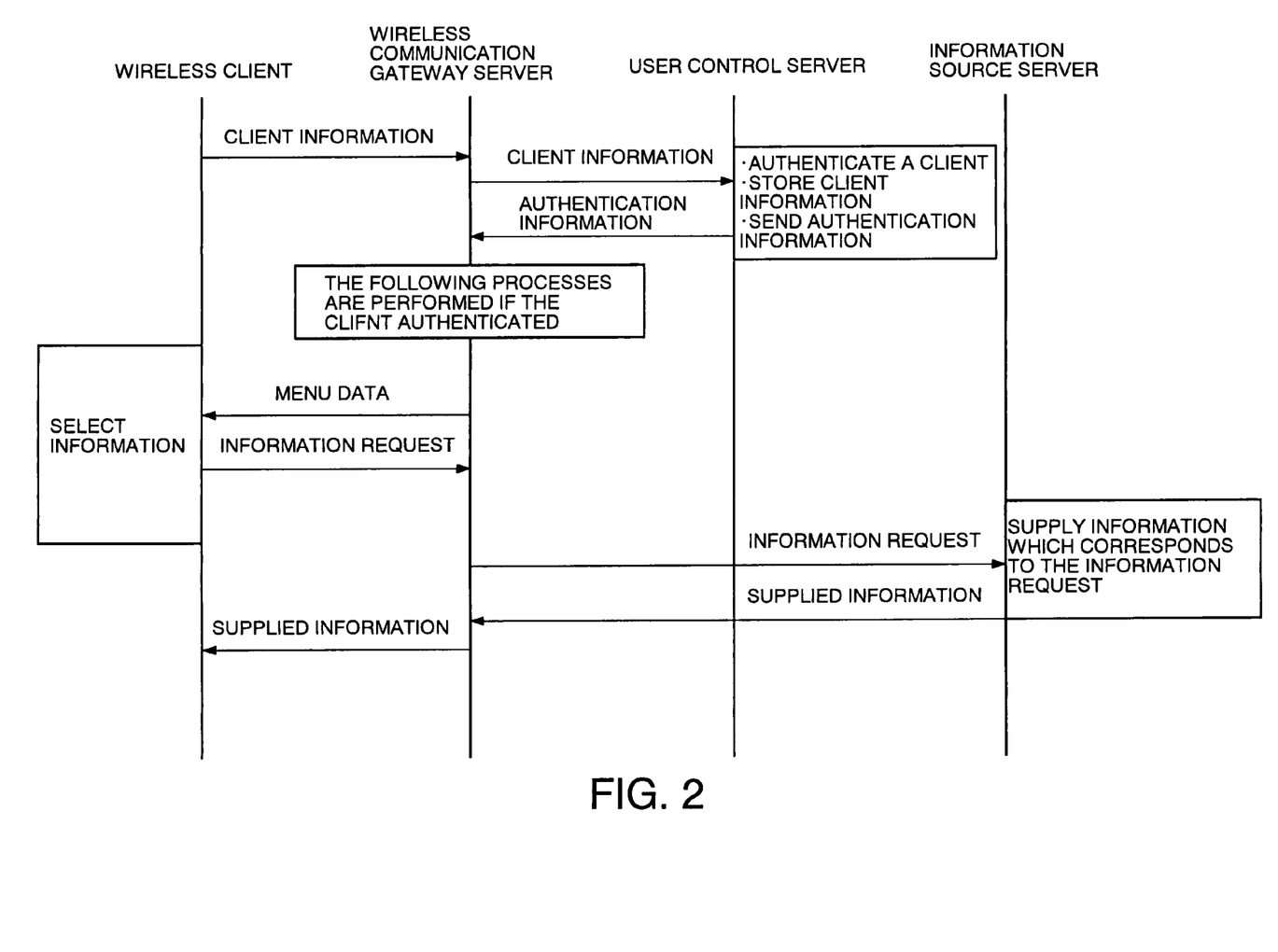
FIG. 2 shows a sequence chart representing procedure of receiving of information from an information source server at a wireless client.

Next, operations of the conventional wireless communication system shown in FIG. 1 are explained with reference to FIG. 2. In FIG. 2, procedure is shown which receives information from the information source server 4 at the wireless client 1. To avoid illegal use of the wireless client 1 or illegal access to the information source server 4, the wireless communication gateway server 31 performs authentication using the user information database 33 including user information which is stored in advance through the user control server 32 connected to the wireless communication gateway server 31 via a dedicated line 102.

The wireless client 1 sends client information of its own to the wireless communication gateway server 31 through the wireless data communication network 101 and an access point A. The client information generally includes a client identifier, an access number (such as a phone number), a user code, and character codes to be used.

The wireless communication gateway server 31 then stores connection state of the wireless client 1 and sends the client information which corresponds to the connected wireless client to the user control server 32. The user control server 32 searches the corresponding client information for the user information database 33. If the corresponding client information is found, the user control server 32 checks authentication by comparing the contents of the client information from the wireless client with the contents of the client information in the user information database 33.

When the contents of both the client information are coincident, the user control server 32 stores the client information from the wireless client and sends authentication information representing that the user is successfully authenticated, to the wireless communication gateway server 31.

If the authentication information represents that authentication is successfully completed, the wireless communication gateway server 31 sends menu data to the wireless client 1. If the authentication information represents that the user is not authenticated, the server 31 is disconnected from the wireless client 1 at this timing.

User of the wireless client 1 selects information along the menu, and the wireless client 1 sends an information request designated by the user to the information source server 4 through the wireless communication gateway server 31. The information source server 4 sends back information which corresponds to the information request to the wireless client 1 through the wireless communication gateway server 31.

Figure 3:
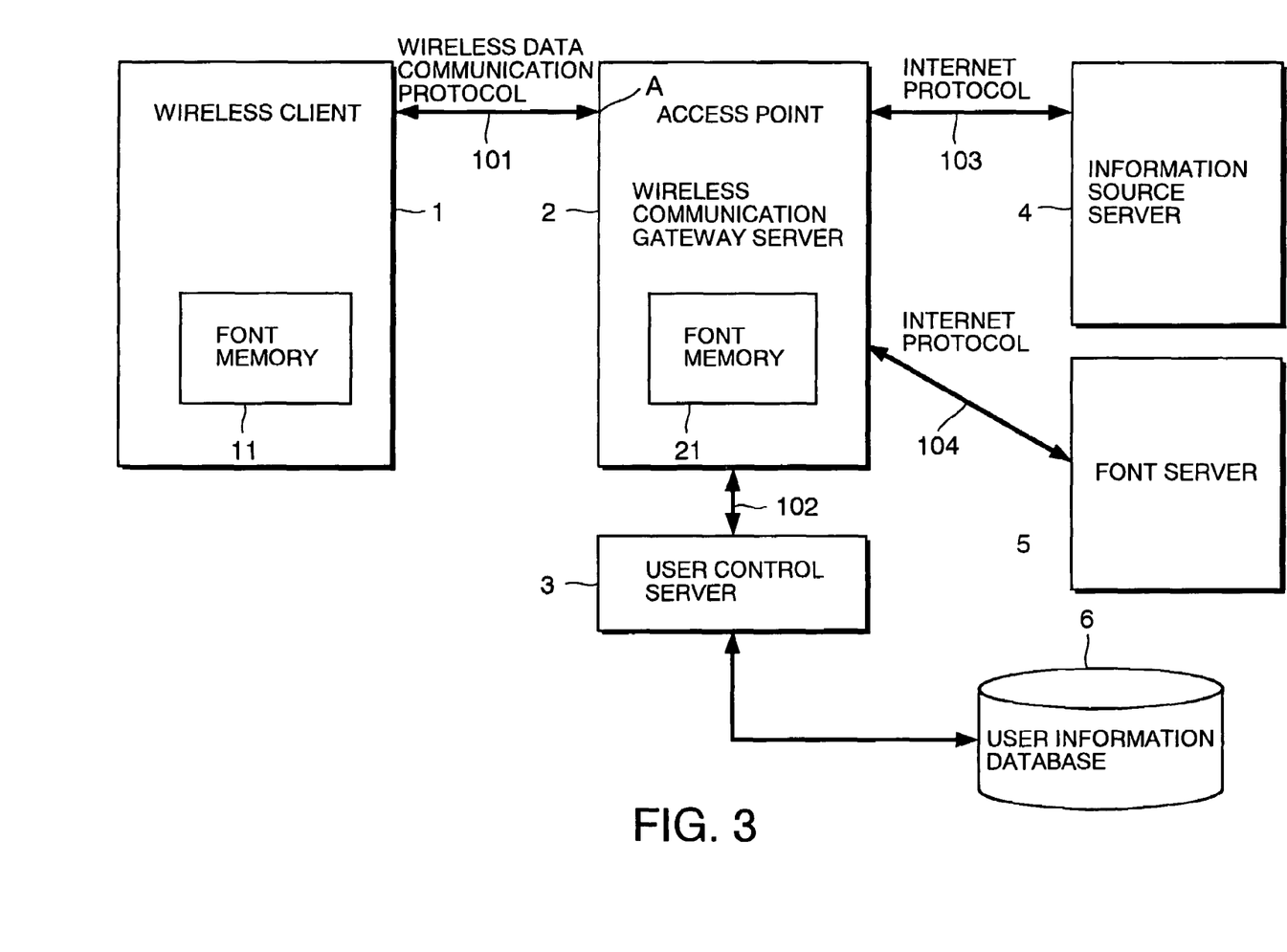
FIG. 3 shows a block diagram representing a wireless communication system according to a first embodiment of the invention.

Next, description is made about a wireless communication system according to a first embodiment of the invention with reference to FIG. 3.

In FIG. 3, the wireless communication system includes a wireless client 1, a wireless communication gateway server 2, a user control server 3, an information source server 4, a font server including a plurality of fonts, and a user information database 6.

Herein, it should be noted that the wireless communication includes wireless communication which adopts a communication method such as PDC, cdmaOne, and Bluetooth, and other wireless communication such as infrared radiation communication.

The wireless client 1 sends an identifier (ID) used to authenticate a user and attribute information of the wireless client 1 to the wireless communication gateway server 2 before commencement of connection service to the Internet 103. Also, the wireless client 1 includes a font memory 11 which stores a font (a font to be displayed if information is displayed, or a voice font if information is provided by a speaker) which is required to inform a user of information from the information source server 4.

The wireless communication gateway server 2 resides between the information source server 4 connected to the Internet 103 and the wireless data communication network 101 and temporarily stores data from the information source server 4. Then, the server 2 sends the data to the wireless client I so that a buffer memory (not shown) in the wireless client I does not overflow, by monitoring a state of the buffer memory. This is done so as to avoid instability of communication due to decrease of a bandwidth, a delay, or an interrupted wave of the Internet 103 and the wireless data communication network 101. Also, the server 2 includes a font memory 21 which stores a font sent from the font server 5.

The user control server 3 is connected to the wireless communication gateway server 2 via the dedicated line 2 and performs authentication using the user information database 6 including user information which is registered in advance, to avoid illegal use of the wireless client 1 or illegal access to the information source server 4.

The information server 4 is connected to the wireless communication gateway server 2 via the Internet 103, and sends requested various information to the wireless client 1.

The font server 5 is connected to the wireless communication gateway server 2 via the Internet 104, and stores a plurality of fonts.

The user information database 6 at least stores client information (generally including a client identifier, an access number (a phone number), a user code, and character codes to be used), a language used in the wireless client, and a time when the wireless client 1 is used, and includes a table of the correspondence between a language and a font to be used in the language.

Figure 4:
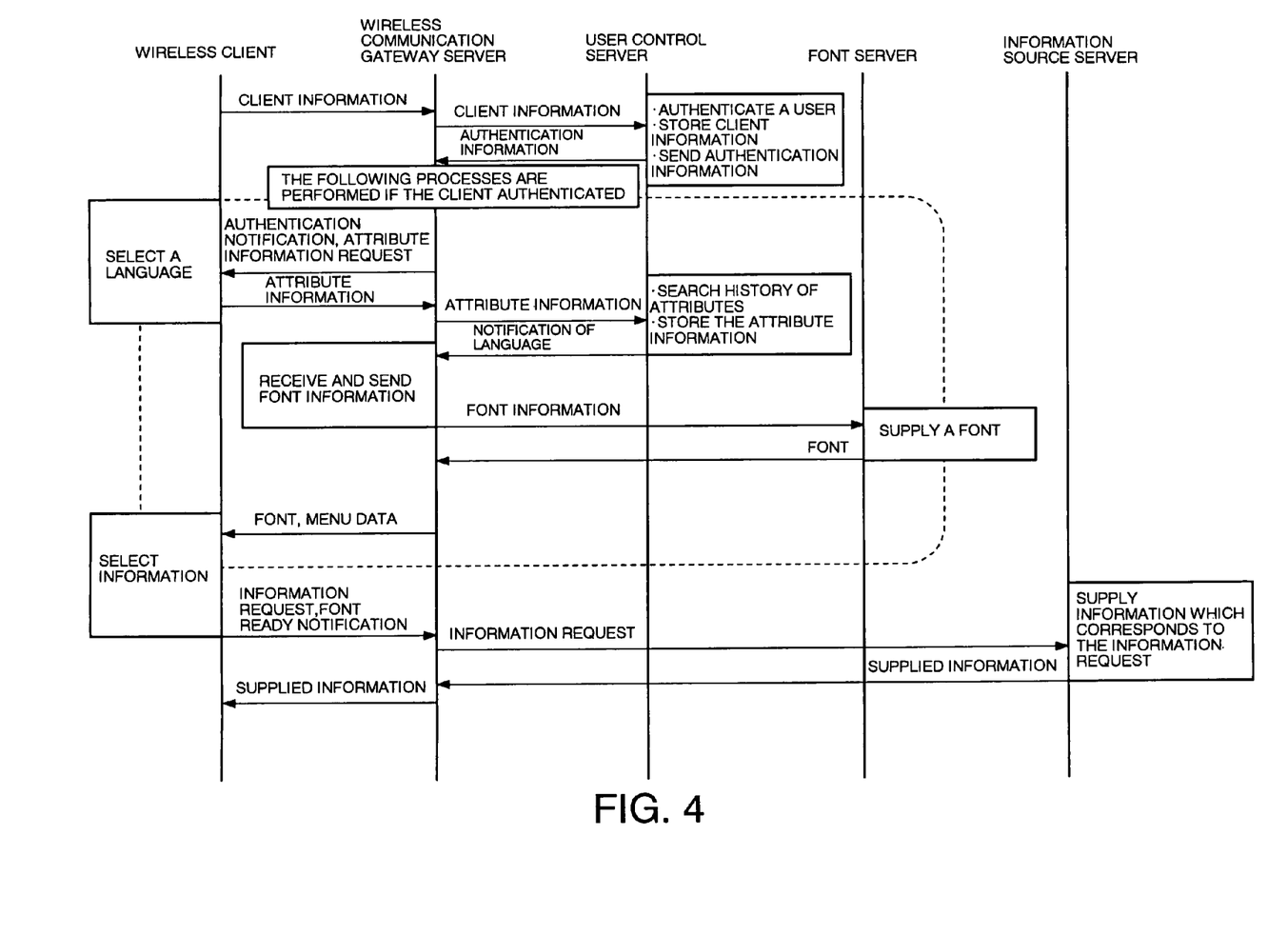
FIG. 4 shows a sequence chart representing procedure of receiving of information from an information source server shown in FIG. 3 at a wireless client.

Next, procedure is explained which receives information from the information source server 4 at the wireless client 1, with reference to FIGS. 3 and 4.

The wireless communication gateway server 2 performs authentication using the user information database 6 including user information which is registered in advance through the user control server 3 connected to the server 2 via dedicated line 102, to avoid illegal use of the wireless client 1 or illegal access to the information source server 4.

The wireless client 1 sends client information of its own to the wireless communication gateway server 2 through the wireless data communication network 101 and an access point A. The client information generally includes a client identifier, an access number (such as a phone number), a user code, and character codes to be used.

The wireless communication gateway server 2 then stores connection state of the wireless client 1 and sends the client information which corresponds to the connected wireless client 1 to the user control server 3. The user control server 3 searches the corresponding client information for the user information database 6. If the corresponding client information is found, the user control server 3 checks authentication by comparing the contents of the client information from the wireless client with the contents of the client information in the user information database 6.

When the contents of both the client information are coincident, the user control server 3 stores the client information from the wireless client and sends authentication information representing that the user is successfully authenticated, to the wireless communication gateway server 2.

If the authentication information represents that the user is successfully authenticated, the wireless communication gateway server 2 sends an authentication notification and attribute information request to the wireless client 1.

If the authentication information represents that the user is not authenticated, the server 2 is disconnected from the wireless client 1 at this timing.

Selection of a language to be used is performed when the authentication notification and the attribute information request are arrived at the wireless client 1. The selection of the language may be given by the wireless client 1 in advance. Alternatively, the user of the wireless client 1 may select the language in connection. The wireless client 1 adds the selected language to the client information, sends the client information to the wireless communication gateway server 2 as attribute information.

The wireless communication gateway server 2 stores the attribute information including at least the language to be used and the client information as connection state, and immediately sends the corresponding attribute information to the user control server 3.

Then, the user control server 3 searches history of attributes using the user information database 6, and stores the attribute information which is sent from the wireless communication gateway server 2 and includes a language to be used. Further, the server 3 determines required font information using the language to be used on the basis of the correspondence table in the user information database 6, and sends back the font information to the wireless communication gateway server 2 as a notification of language to be used.

The wireless communication gateway server 2 determines that the notification of language to be used is a reply from the user control server 3 receiving the attribute information, and receives the font information. The font is often included in a font server 5, but for a special font such as a pictogram, may be distributed in a plurality of font servers 5.

The wireless communication gateway server 2 sends the font information to the corresponding font server 5. Then the font server 5 sends a font designated by the font information to the wireless communication gateway server 2. The wireless communication gateway server 2 stores the font in the font memory 21 and sends menu data and the font stored in the font memory 21 to the wireless client 1.

The wireless client 1 accumulates the font sent from the server 2 into the font memory 11, and sends an information request and a font ready notification (which represents that preparation of using the font is completed) to the wireless communication gateway server 2 in selecting information. Then the wireless communication gateway server 2 sends the information request to the information source server 4. The information source server 4 sends back information which corresponds to the request to the wireless client 1 via the wireless communication gateway server 2.

By using the above method, it is capable of overcoming the problem of the conventional method. In the method, the system can be operated effectively and correct display is achieved since a font required for the wireless client 1 is stored in the wireless client 1.

Further, in the embodiment of the invention, information provider can accumulate a font required for an advertisement in the font server 5 in advance since the font is prepared before information is provided.

Still further, a font in a wireless client 1 which is used in a region can be changed to another font required in another region where the wireless client 1 is used. Therefore, the wireless client 1 becomes more convenient for the user.

Furthermore, it is possible to use a plurality of languages at the wireless client 1 by designating a plurality of languages as the notification of language to be used when the user control server 3 determines a font to be used based on the attribute information.

Also, the font is not limited to a character font. That is, by accumulating a voice font which is proposed by W3C in the font server 5, even a visually handicapped person can use the information service.

Figure 5:
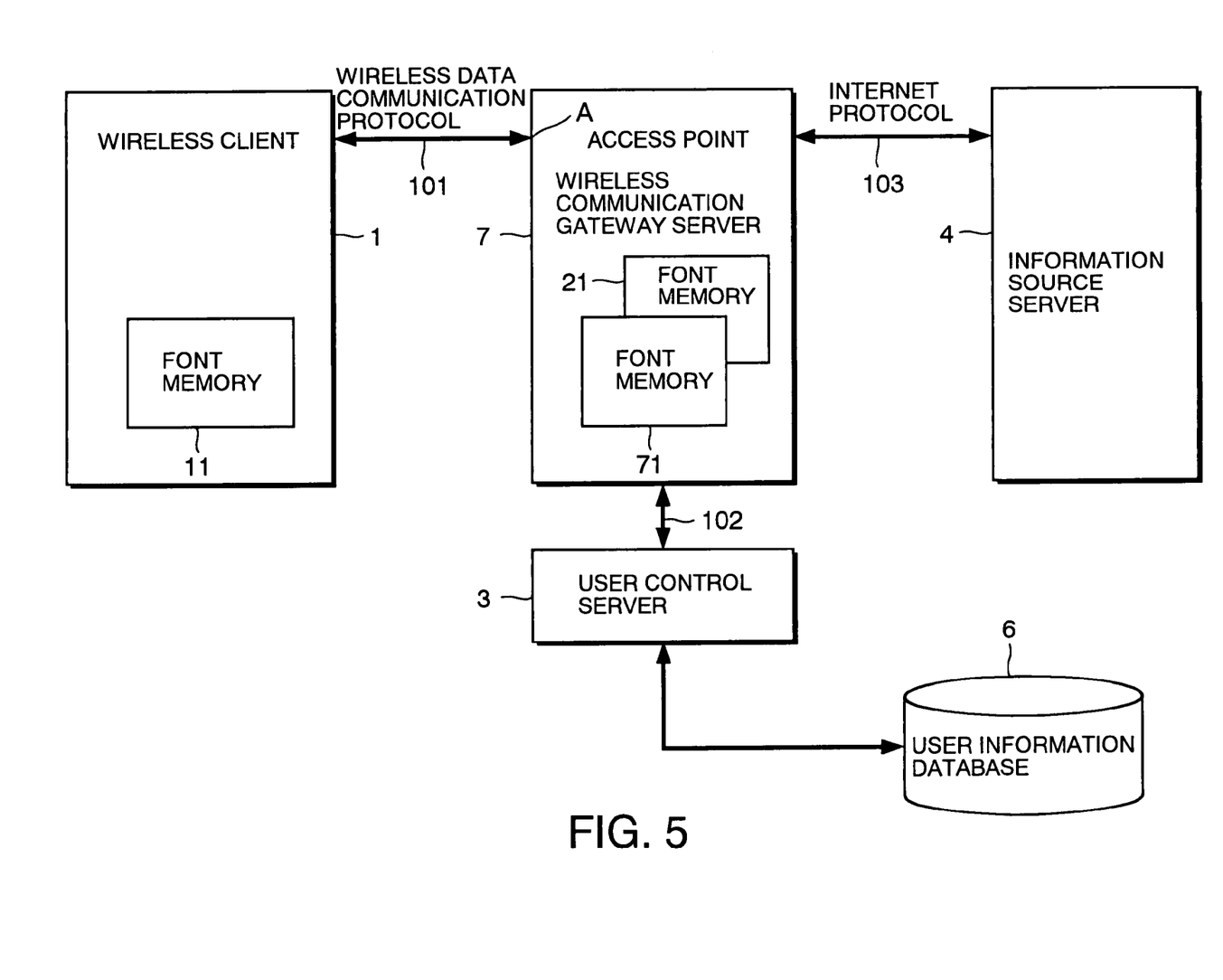
FIG. 5 shows a block diagram representing a wireless communication system according to a second embodiment of the invention.

Next, description is made about a wireless communication system according to a second embodiment of the invention with reference to FIG. 5. The system is different from the system shown in FIG. 3 in that font memories 21 and 71 are included in a wireless communication gateway server 7 and there is no font server. Also, elements shown in FIG. 5 each of which is the same as the corresponding element shown in FIG. 3 have the same numeric symbols as the corresponding elements shown in FIG. 3.

Further, operations of the elements shown in FIG. 5 each of which is the same as the corresponding element shown in FIG. 3 are the same as the operations of the corresponding elements. Also, it is assumed that a font is accumulated, in advance, in the font memories 21 and 71 in the wireless communication gateway server 7 in the system.

Figure 6:
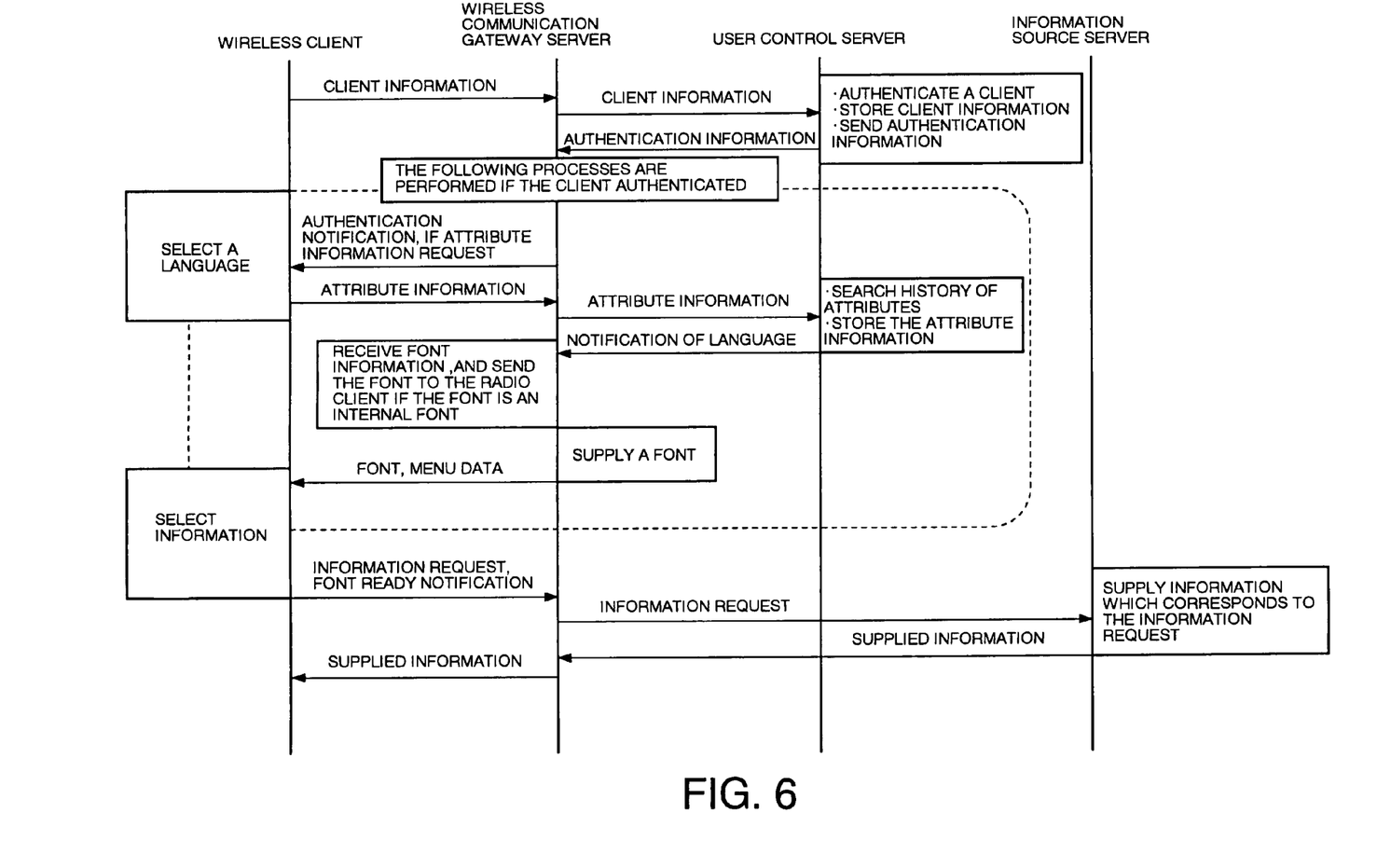
FIG. 6 shows a sequence chart representing procedure of receiving of information from an information source server shown in FIG. 5 at a wireless client.

Hereinafter, description is made about procedure of receiving information from the information source server 4 at the wireless client 1 with reference to FIGS. 5 and 6.

To avoid illegal use of the wireless client 1 or illegal access to the information source server 4, the wireless communication gateway server 7 performs authentication using the user information database 6 including user information which is stored in advance, through the user control server 3 connected to the wireless communication gateway server 7 via a dedicated line 102.

The wireless client 1 sends client information of its own to the wireless communication gateway server 7 through the wireless data communication network 101 and an access point A. The wireless communication gateway server 7 then stores connection state of the wireless client 1 and sends the client information which corresponds to the connected wireless client to the user control server 3.

The user control server 3 searches the corresponding client information for the user information database 6. If the corresponding client information is found, the user control server 3 checks authentication by comparing the contents of the client information from the wireless client with the contents of the client information in the user information database 6.

When the contents of both the client information are coincident, the user control server 3 stores the client information from the wireless client and sends authentication information representing that the user is successfully authenticated, to the wireless communication gateway server 7.

If the authentication information represents that the user is successfully authenticated, the wireless communication gateway server 7 sends an authentication notification and an attribute information request to the wireless client 1.

If the authentication information represents that the user is not authenticated, the server 7 is disconnected from the wireless client 1 at this timing.

Selection of a language to be used is performed when the authentication notification and the attribute information request are arrived at the wireless client 1. The wireless client 1 adds the selected language to the client information, sends the client information to the wireless communication gateway server 7 as attribute information.

The wireless communication gateway server 7 stores the attribute information including at least the language to be used and the client information as connection state, and immediately sends the corresponding attribute information to the user control server 3.

Then, the user control server 3 searches history of attributes using the user information database 6, and stores the attribute information which is sent from the wireless communication gateway server 7 and includes a language to be used. Further, the server 3 determines required font information using the language to be used on the basis of the correspondence table in the user information database 6, and sends back the font information to the wireless communication gateway server 7 as a notification of language to be used.

The wireless communication gateway server 7 determines that the notification of language to be used is a reply from the user control server 3 receiving the attribute information, and receives the font information. The server 7 determines whether or not the font designated by the font information is included in the font memory 21 or 71. Then if the wireless client 1 uses the internal font stored in the font memory 21 or 71, menu data and the font are sent to the wireless client 1.

The wireless client 1 accumulates the font sent from the server 7 into the font memory 11, and sends an information request and a font ready notification to the wireless communication gateway server 7 in selecting information. Then the wireless communication gateway server 7 sends the information request to the information source server 4. The information source server 4 sends back information which corresponds to the request to the wireless client 1 via the wireless communication gateway server 7.

As described above, even if the wireless communication gateway server 7 includes font memories 21 and 71, the same effect is obtained as the wireless communication system of the first embodiment of the invention, which locates the font server 5 at the outside of the wireless communication gateway server 2. In this case, since it is possible to omit communication between the font server 5 and the wireless communication gateway server 2, a time and a cost for the communication can be eliminated.

Figure 7:
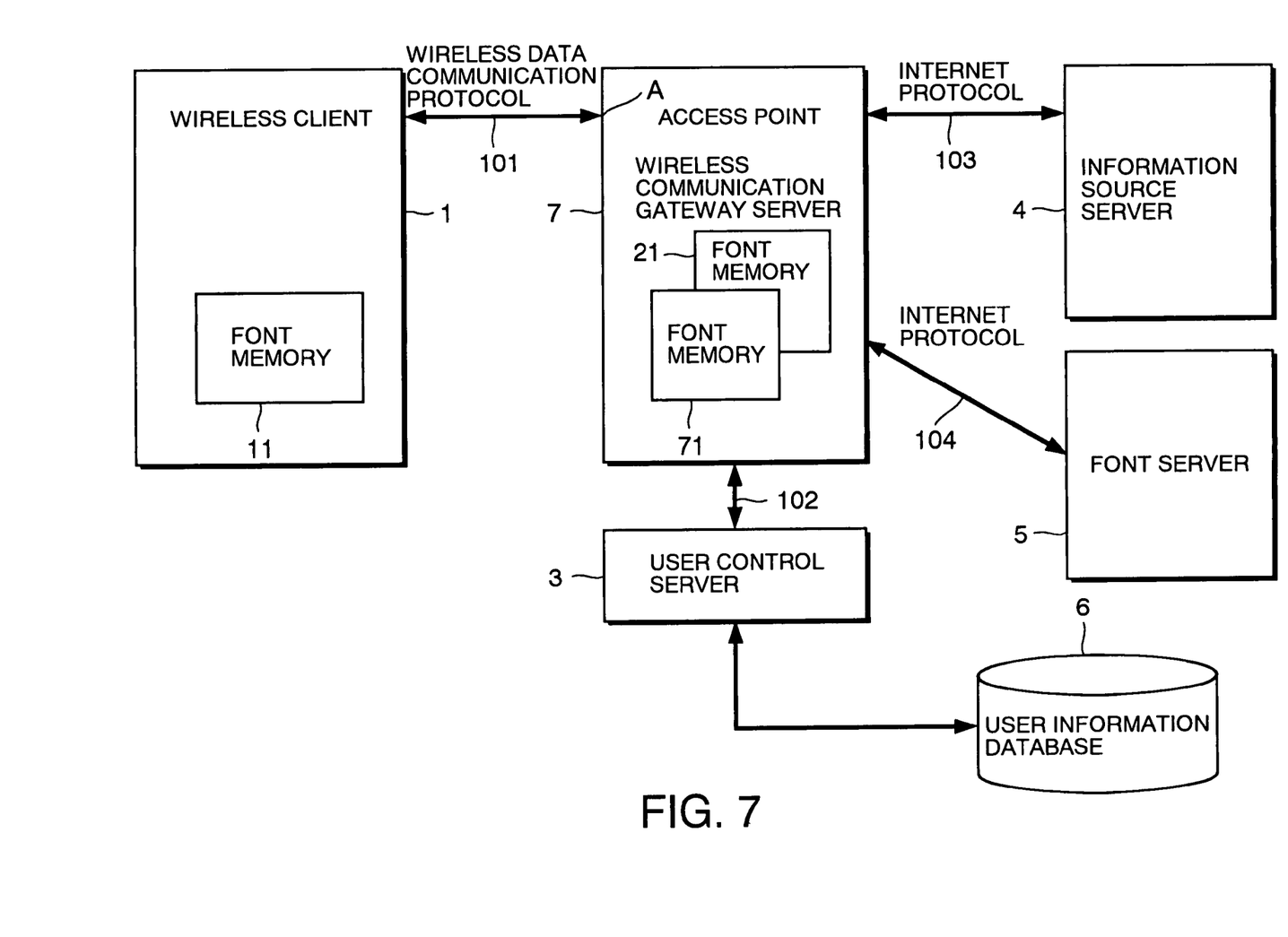
FIG. 7 shows a block diagram representing a wireless communication system according to a third embodiment of the invention.

Next, description is made about a wireless communication system according to a third embodiment of the invention with reference to FIG. 7. The system is different from the system shown in FIG. 3 in that font memories 21 and 71 are included in a wireless communication gateway server 7. Also, elements shown in FIG. 7 each of which is the same as the corresponding element shown in FIG. 3 have the same numeric symbols as the corresponding elements shown in FIG. 3.

Further, operations of the elements shown in FIG. 7 each of which is the same as the corresponding element shown in FIG. 3 are the same as the operations of the corresponding elements.

Figure 8:
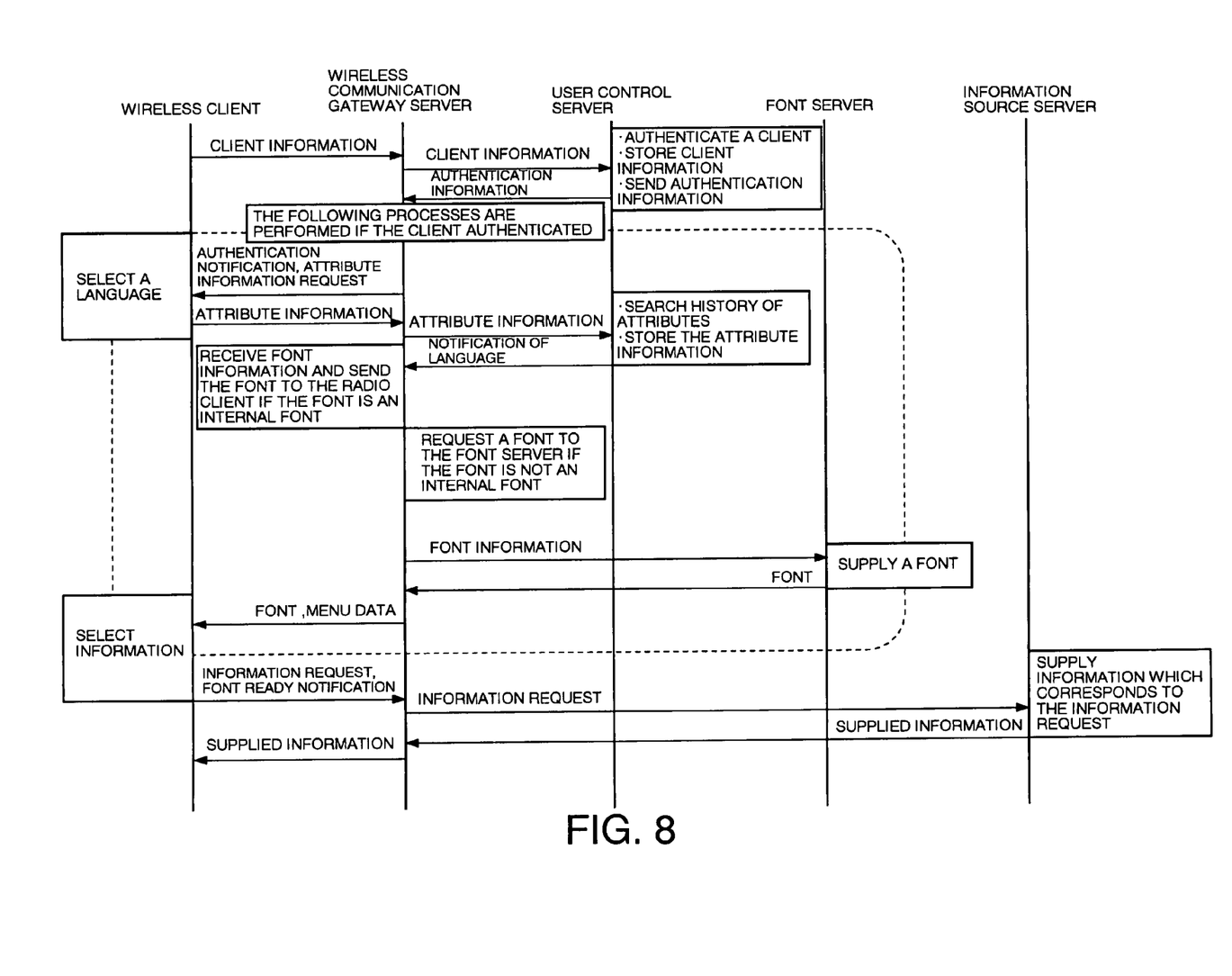
FIG. 8 shows a sequence chart representing procedure of receiving of information from an information source server shown in FIG. 7 at a wireless client.

Hereinafter, description is made about procedure of receiving information from the information source server 4 at the wireless client 1 with reference to FIGS. 7 and 8.

To avoid illegal use of the wireless client 1 or illegal access to the information source server 4, the wireless communication gateway server 7 performs authentication using the user information database 6 including user information which is stored in advance, through the user control server 3 connected to the wireless communication gateway server 7 via a dedicated line 102.

The wireless client 1 sends client information of its own to the wireless communication gateway server 7 through the wireless data communication network 101 and an access point A. The wireless communication gateway server 7 then stores connection state of the wireless client 1 and sends the client information which corresponds to the connected wireless client to the user control server 3.

The user control server 3 searches the corresponding client information for the user information database 6. If the corresponding client information is found, the user control server 3 checks authentication by comparing the contents of the client information from the wireless client with the contents of the client information in the user information database 6.

When the contents of both the client information are coincident, the user control server 3 stores the client information from the wireless client and sends authentication information representing that the user is successfully authenticated, to the wireless communication gateway server 7.

If the authentication information represents that the user is successfully authenticated, the wireless communication gateway server 7 sends an authentication notification and an attribute information request to the wireless client 1.

If the authentication information represents that the user is not authenticated, the server 7 is disconnected from the wireless client 1 at this timing.

Selection of a language to be used is performed when the authentication notification and the attribute information request are arrived at the wireless client 1. The wireless client 1 adds the selected language to the client information, sends the client information to the wireless communication gateway server 7 as attribute information.

The wireless communication gateway server 7 stores the attribute information including at least the language to be used and the client information as connection state, and immediately sends the corresponding attribute information to the user control server 3.

Then, the user control server 3 searches history of attributes using the user information database 6, and stores the attribute information which is sent from the wireless communication gateway server 7 and includes a language to be used. Further, the server 3 determines required font information using the language to be used on the basis of the correspondence table in the user information database 6, and sends back the font information to the wireless communication gateway server 7 as a notification of language to be used.

The wireless communication gateway server 7 determines that the notification of language to be used is a reply from the user control server 3 receiving the attribute information, and receives the font information. The server 7 determines whether or not the font designated by the font information is included in the font memory 21 or 71. Then if the wireless client 1 uses the internal font stored in the font memory 21 or 71, menu data and the designated font are sent to the wireless client 1.

But, if the wireless client 1 can not use the internal font, the wireless communication gateway server 7 sends the used font information to the corresponding font server 5, and the font server 5 sends the required font to the server 7.

The server 7 then stores the font which is sent from the font server 5 into the font memories 21 and 71, and sends a menu and the font used in the menu to the wireless client 1.

The wireless client 1 accumulates the font sent from the server 7 into the font memory 11, and sends an information request and a font ready notification to the wireless communication gateway server 7 in selecting information. Then the wireless communication gateway server 7 sends the information request to the information source server 4. The information source server 4 sends back information which corresponds to the request to the wireless client 1 via the wireless communication gateway server 7.

As described above, in the system of the third embodiment of the invention, if the font to be used is included in the wireless communication gateway server 7, the font is supplied from the internal memory 21 or 71 to the wireless client. On the other hand, if the font to be used is not included in the server 7, the font is supplied from the font server 5. Therefore, a time and a cost when the wireless client 1 gets the font can be reduced.

Figure 9:
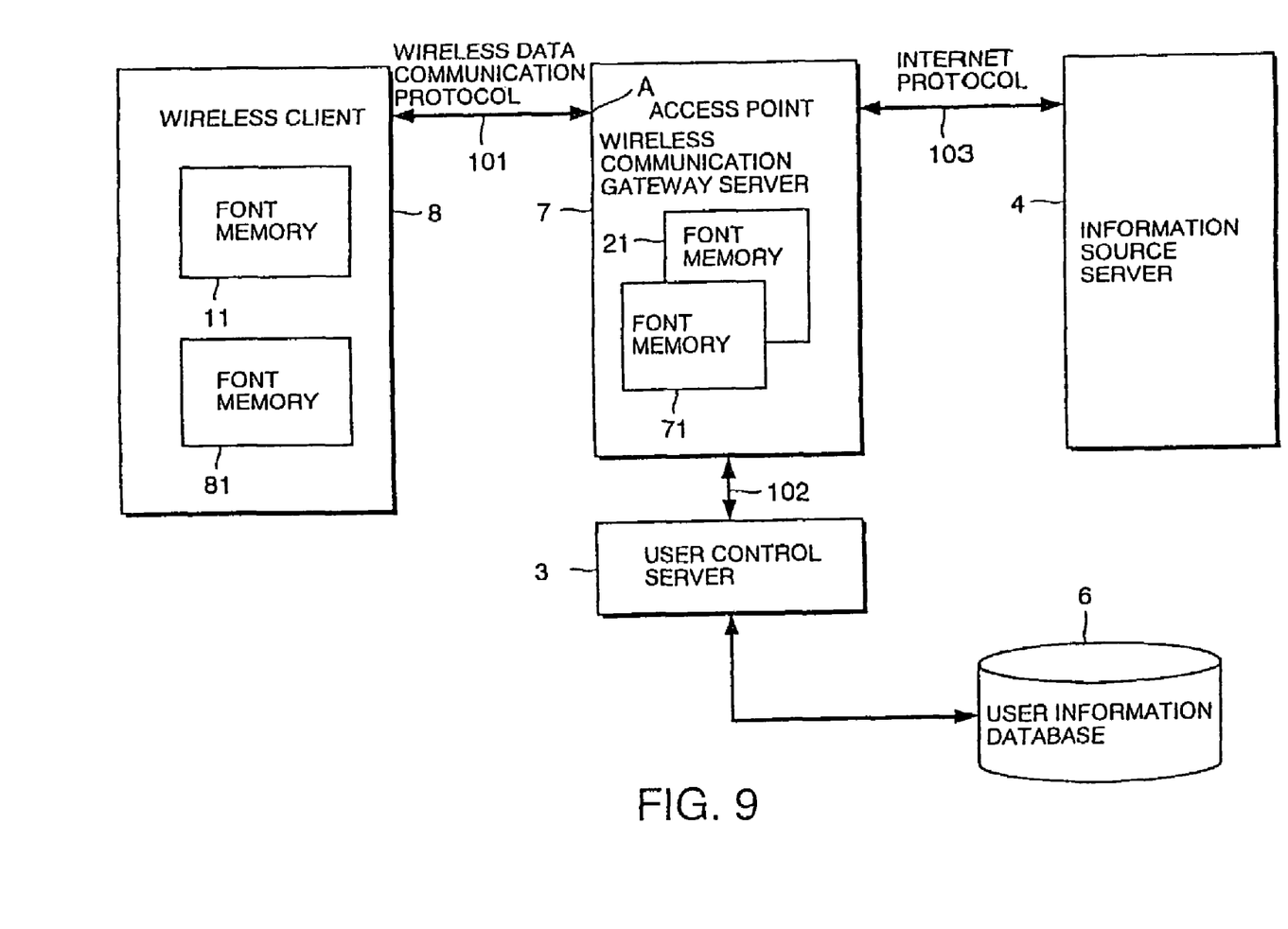
FIG. 9 shows a block diagram representing a wireless communication system according to a fourth embodiment of the invention.

Next, description is made about a wireless communication system according to a fourth embodiment of the invention with reference to FIG. 9. The system is different from the system shown in FIG. 5 in that font memories 11 and 81 are included in a wireless client 8. Also, elements shown in FIG. 9 each of which is the same as the corresponding element shown in FIG. 5 have the same numeric symbols as the corresponding elements shown in FIG. 5.

Further, operations of the elements shown in FIG. 9 each of which is the same as the corresponding element shown in FIG. 5 are the same as the operations of the corresponding elements.

Figure 10:
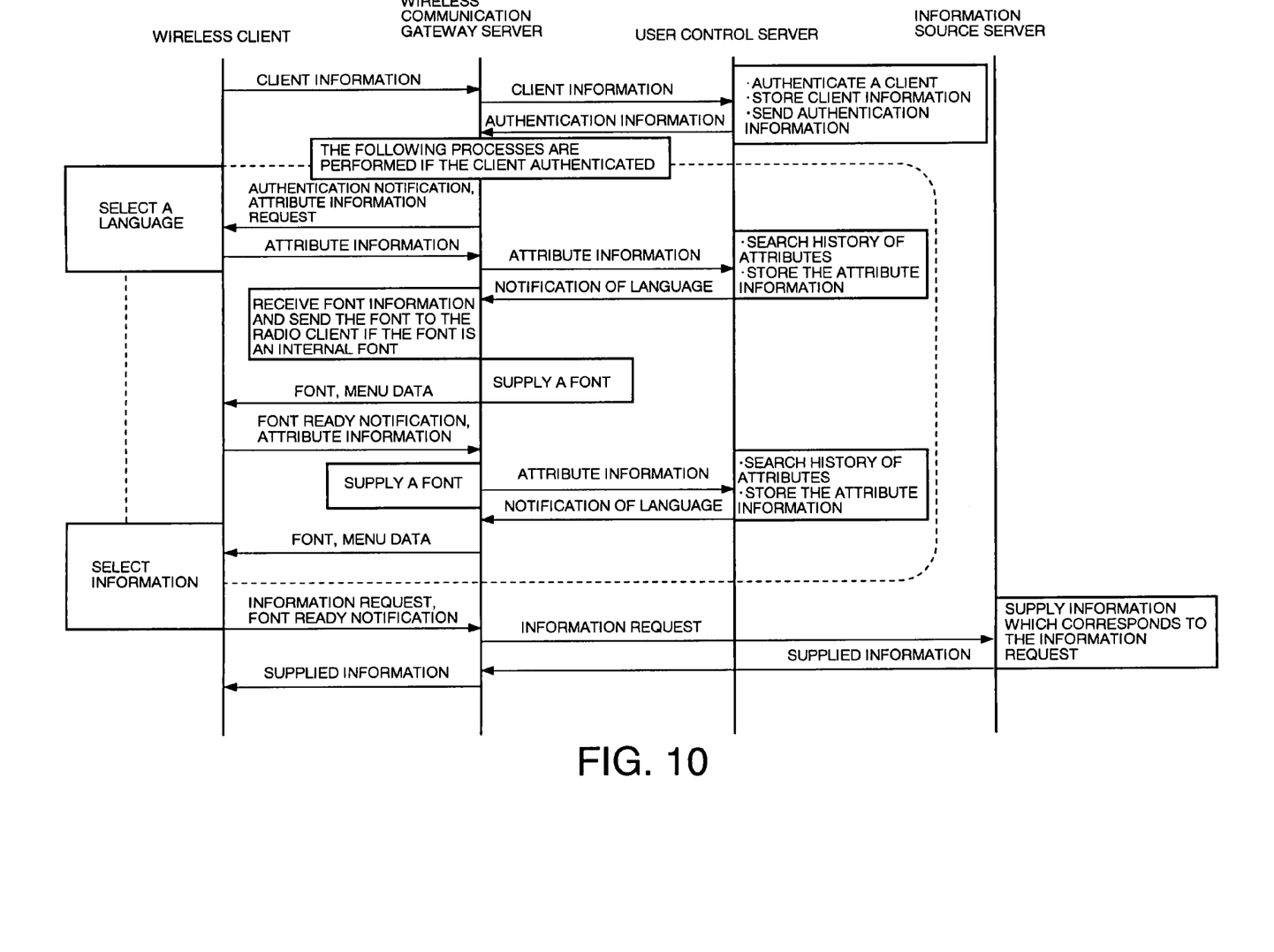
FIG. 10 shows a sequence chart representing procedure of receiving of information from an information source server shown in FIG. 9 at a wireless client.

Hereinafter, description is made about procedure of receiving information from the information source server 4 at the wireless client 8 with reference to FIGS. 9 and 10.

To avoid illegal use of the wireless client 8 or illegal access to the information source server 4, the wireless communication gateway server 7 performs authentication using the user information database 6 including user information which is stored in advance, through the user control server 3 connected to the wireless communication gateway server 7 via a dedicated line 102.

The wireless client 8 sends client information of its own to the wireless communication gateway server 7 through the wireless data communication network 101 and an access point A. The wireless communication gateway server 7 then stores connection state of the wireless client 8 and sends the client information which corresponds to the connected wireless client to the user control server 3.

The user control server 3 searches the corresponding client information for the user information database 6. If the corresponding client information is found, the user control server 3 checks authentication by comparing the contents of the client information from the wireless client with the contents of the client information in the user information database 6.

When the contents of both the client information are coincident, the user control server 3 stores the client information from the wireless client and sends authentication information representing that the user is successfully authenticated, to the wireless communication gateway server 7.

If the authentication information represents that the user is successfully authenticated, the wireless communication gateway server 7 sends an authentication notification and an attribute information request to the wireless client 8.

If the authentication information represents that the user is not authenticated, the server 7 is disconnected from the wireless client 8 at this timing.

Selection of a language to be used is performed when the authentication notification and the attribute information request are arrived at the wireless client 8. The wireless client 8 adds the selected language to the client information, sends the client information to the wireless communication gateway server 7 as attribute information.

The wireless communication gateway server 7 stores the attribute information including at least the language to be used and the client information as connection state, and immediately sends the corresponding attribute information to the user control server 3.

Then, the user control server 3 searches history of attributes using the user information database 6, and stores the attribute information which is sent from the wireless communication gateway server 7 and includes a language to be used. Further, the server 3 determines required font information using the language to be used on the basis of the correspondence table in the user information database 6, and sends back the font information to the wireless communication gateway server 7 as a notification of language to be used.

The wireless communication gateway server 7 determines that the notification of language to be used is a reply from the user control server 3 receiving the attribute information, and receives the font information. The server 7 determines whether or not the font designated by the font information is included in the font memory 21 or 71. Then if the wireless client 8 uses the internal font stored in the font memory 21 or 71, menu data and the designated font are sent to the wireless client 8.

The wireless client 8 may send an attribute information including a language which is further required and a font ready notification to the server 7.

The server 7 then stores the attribute information as connection state and immediately sends the corresponding attribute information to the user control server 3.

Then, the user control server 3 searches history of attributes using the user information database 6, and stores the attribute information. Further, the server 3 determines required font information to use the language and sends back the font information to the wireless communication gateway server 7 as a notification of language to be used.

The wireless communication gateway server 7 determines that the notification of language to be used is a reply from the user control server 3 receiving the attribute information, and receives the font information. The server 7 determines whether or not the font designated by the font information is included in the font memory 21 or 71. Then if the wireless client 8 uses the internal font stored in the font memory 21 or 71, menu data and the designated font are sent to the wireless client 8.

The wireless client 8 accumulates the font which is sent into the font memory 81 and sends an information request and a font ready notification to the wireless communication gateway server 7 in selecting information. Then the wireless communication gateway server 7 sends the information request to the information source server 4. The information source server 4 sends back information which corresponds to the request to the wireless client 8 via the wireless communication gateway server 7.

As described above, in the system of the fourth embodiment of the invention, if the wireless client 8 includes the font memories 11 and 81, only an actually required font is requested since the font memories keeps a font which has been used. This is done by holding history of languages to be used and a plurality of fonts of the wireless client 8 at the user control server 3. Therefore, in this method, it is possible to reduce a communication time since transferring of an unused font is eliminated.

As mentioned above, according to the invention, a wireless communication gateway server which resides between an information source server connected to the Internet and a wireless data communication network, temporarily accumulates data from the information source server, sends the data to a wireless client according to a receiving state of the wireless client.

A font which is stored in the wireless client is determined when the data are provided by the information source server in authentication which is performed in starting service of the wireless client. The wireless client can store only a necessary font by sending the determined font to the wireless client. Therefore, effective operation can be made in the system and in the wireless client, incorrect display can be eliminated.

What is claimed is:

1. A wireless communication system which supplies information data to a wireless client through a wireless data communication network, comprising:

an information source server which includes the information data; and a gateway server which is connected to the information source server via a network and selectively connected to the wireless client via the wireless data communication network, the gateway server comprising:

a font storing unit for storing a font which is used in the wireless client to output the information data;

a font determining unit for determining a font to be stored in the font storing unit, said font determining unit determines the font which corresponds to a language selected in the wireless client;

a font transferring unit for transferring the determined font to the wireless client; and an authenticating unit which performs authentication for connecting the wireless client to the gateway server, wherein the gateway server temporarily stores the information data sent from the information source server and sends the information data to the wireless client according to a data reception state of the wireless client concerned with the determined font, and the font determining unit determines the font while the authenticating unit performs the authentication.

2. The wireless communication system of claim 1, wherein the user control server cooperates with the gateway server.

3. A wireless communication system which supplies information data to a wireless client through a wireless data communication network, comprising:

an information source server which includes the information data; and a gateway server which is connected to the information source server via a network and selectively connected to the wireless client via the wireless data communication network, the gateway server comprising:

a font storing unit for storing a font which is used in the wireless client to output the information data;

a font determining unit for determining a font to be stored in the font storing unit, said font determining unit determines the font which corresponds to a language selected in the wireless client;

a font transferring unit for transferring the determined font to the wireless client; and an authenticating unit which performs authentication for connecting the wireless client to the gateway server, wherein the gateway server temporarily stores the information data sent from the information source server and sends the information data to the wireless client according to a data reception state of the wireless client concerned with the determined font, and the font determining unit determines the font while the authenticating unit performs the authentication, and the font determining unit determines the font by using a user information database which includes at least user information stored in advance to be used in the authenticating unit, correspondence information which represents relationship between the language used by the font determining unit and the font stored to display the information data, and history of determining results of the font determining unit.

4. The wireless communication system of claim 1 further comprising a font server which stores a plurality of candidate fonts used and selected by the font determining unit.

5. A wireless communication system which supplies information data to a wireless client through a wireless data communication network, comprising:

an information source server which includes the information data; and a gateway server which is connected to the information source server via a network and selectively connected to the wireless client via the wireless data communication network, the gateway server comprising:

a font storing unit for storing a font which is used in the wireless client to output the information data;

a font determining unit for determining a font to be stored in the font storing unit, said font determining unit determines the font which corresponds to a language selected in the wireless client;

a font transferring unit for transferring the determined font to the wireless client; and an authenticating unit which performs authentication for connecting the wireless client to the gateway server, wherein the gateway server temporarily stores the information data sent from the information source server and sends the information data to the wireless client according to a data reception state of the wireless client concerned with the determined font, and the font determining unit determines the font while the authenticating unit performs the authentication, and a plurality of candidate fonts used by the font determining unit are stored to be determined as the determined font in the gateway server.

6. The wireless communication system of claim 1, wherein the determined font is a character font used to display.

7. The wireless communication system of claim 1, wherein the determined font is a special font representing a pictogram.

8. The wireless communication system of claim 1, wherein the determined font is a voice font used to output a voice.

9. A method of changing language displayed in a wireless client of a wireless communication system which includes a gateway server connected to the wireless client via a wireless data communication network, comprising, at the gateway server, the steps of:

temporarily storing information data;

sending the information data to the wireless client according to a data reception state of the wireless client;

determining a font which corresponds to a language selected in the wireless client, said font used in the wireless client to output the information data;

performing authentication for connecting the wireless client to the gateway server; and transferring the determined font to the wireless client, wherein the font determining step determines the font while the authenticating step is performed.

10. The method of claim 9, wherein the authenticating step and the font determining step cooperate with the remaining steps performed at the gateway server.

11. The method of claim 10, wherein the font determining step determines the font and the authenticating step authenticates the user, by using a user information database which includes at least user information which is stored in advance, correspondence information which represents relationship between the language used by the font determining step and the font stored to output the information data, and history of determining results of the font determining step.

12. The method of claim 9, wherein the font is a character font used to display the information data.

13. The method of claim 9, wherein the font is a special font representing a pictogram included in the information data.

14. The method of claim 9, wherein the font is a voice font used to output a voice included in the information data.

15. A wireless client of a wireless communication system which sends information data from an information source server to the wireless client via a gateway server, said wireless client comprising:

a language notifying unit which notifies the gateway server of a language;

a font storing unit which stores a font which is determined by the gateway server based on the language and sent from the gateway server; and an output unit which outputs the information data from the information source server by using the stored font, wherein the font stored in the font storing unit is sent from the gateway server which stores candidate fonts, and the font is determined while authentication for connecting the wireless client to the gateway server is performed.

16. The wireless client of claim 15, wherein the font storing unit includes a plurality of storage areas and only a font which has not been stored in the storage areas is newly stored in one of an empty storage areas.

17. The wireless client of claim 15, the font stored in the font storing unit is sent from a font server which stores candidate fonts.

18. The wireless client of claim 15, wherein the font is a character font used to display the information data.

19. The wireless client of claim 15, wherein the font is a special font representing a pictogram included in the information data.

20. The wireless client of claim 15, wherein the font is a voice font used to output a voice included in the information data.

21. A gateway server of a wireless communication system which sends information data from an information source server to a wireless client via the gateway server comprising:
 a font determining unit which determines a font to be used in the wireless client, said font corresponding to a language selected in the wireless client;
 a font transferring unit which transfers the determined font to the wireless client; and
 an authenticating unit which performs authentication for connecting the wireless client to the gateway server, wherein the font determining unit determines the font while the authenticating unit performs the authentication.

22. The gateway server of claim 21 further including a font storing unit which stores the candidate font.

23. The gateway server of claim 22, wherein the font storing unit includes a plurality of storage areas.

24. The gateway server of claim 21, wherein the font is a character font used to display the information data.

25. The gateway server of claim 21, wherein the font is a special font representing a pictogram included in the information data.

26. The gateway server of claim 21, wherein the font is a voice font used to output a voice included in the information data.

27. A user control server of a wireless communication system which sends information data from an information source server to a wireless client via a gateway server including the user control server comprising:
 an authenticating unit which performs authentication for connecting the wireless client to the gateway server;
 a font determining unit which determines a font to be used in the wireless client, said font determining unit determining the font which corresponds to a language selected in the wireless client; and
 a font transferring unit which transfers the determined font to the wireless client,
 wherein the user controlled server is connected to the wireless client and the information source server via the gateway server, and the font determining unit determines the font while the authenticating unit performs the authentication.

28. The user control server of claim 27, cooperating with the gateway server.

29. The user control server of claim 27, wherein the authenticating unit and the font determining unit determines the font by using a user information database which includes at least user information which is stored in advance, correspondence information which represents relationship between a language and a font used in the language, and history of determining results of the font determining unit.

30. The user control server of claim 27, wherein the candidate fonts are stored in a font server which is connected to the gateway server.

31. The user control server of claim 27, wherein the candidate fonts are stored in the gateway server.

32. The user control server of claim 27, wherein the font is a character font used to display the information data.

33. The user control server of claim 27, wherein the font is a special font representing a pictogram included in the information data.

34. The user control server of claim 27, wherein the font is a voice font used to output a voice included in the information data.

35. A font server of a wireless communication system which sends information data from an information source server to a wireless client via a gateway server to which the font server is connected comprising:
 a font storing unit which stores a font used to represent the information data in the wireless client;
 font determining unit determining the font to be transferred to the wireless unit, said font determining unit determining the font which corresponds to a language selected in the wireless client; and
 a font supplying unit which supplies the font in the font storing unit to the gateway server in response to a request from the gateway server,
 wherein the gateway server includes an authenticating unit which performs authentication for connecting the wireless client to the gateway server and the font determining unit determines the font while the authenticating unit performs the authentication.

36. The font server of claim 35, wherein the font is a character font used to display the information data.

37. The font server of claim 35, wherein the font is a special font representing a pictogram included in the information data.

38. The font server of claim 35, wherein the font is a voice font used to output a voice included in the information data.

39. A recording medium readable by a computer, tangibly embodying a program of instructions executable by the computer to perform a method of changing language displayed in a wireless client of a wireless communication system, the method comprises the steps of:
 at the gateway server which is connected to the wireless client via the wireless data communication network,
 temporarily storing information data;
 sending the information data to the wireless client according to a state for data receiving of the wireless client;
 determining a font which corresponds to a language selected in the wireless client, said font used in the wireless client to output the information data;
 performing authentication for connecting the wireless client to the gateway server; and
 transferring the determined font to the wireless client, wherein the font determining step determines the font while the authenticating step is performed.

* * * * *